(12) United States Patent
Salzer et al.

(10) Patent No.: US 6,460,436 B1
(45) Date of Patent: Oct. 8, 2002

(54) REVERSIBLE MICROMACHINING LOCATOR

(75) Inventors: Leander J. Salzer, Los Almos, NM (US); Larry R. Foreman, deceased, late of Los Alamos, NM (US), by Trudi Foreman Legal Representative

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/717,805

(22) Filed: Nov. 20, 2000

Related U.S. Application Data

(63) Continuation-in-part of application No. 09/276,861, filed on Mar. 26, 1999, now abandoned, which is a continuation of application No. 08/925,096, filed on Sep. 8, 1997, now Pat. No. 5,944,329.
(60) Provisional application No. 60/025,849, filed on Sep. 6, 1996.

(51) Int. Cl.[7] .............................. B23B 1/00; B23B 43/00
(52) U.S. Cl. ................. 82/1.11; 82/47; 82/162
(58) Field of Search .............................. 82/1.11, 46, 47, 82/152, 156, 162, 164, 166

(56) References Cited

U.S. PATENT DOCUMENTS

| | | | |
|---|---|---|---|
| 1,338,178 A | 4/1920 | Henderson | |
| 3,271,848 A | 9/1966 | Montandon | |
| 4,449,027 A | 5/1984 | Fujikawa | 219/69 E |
| 4,584,148 A * | 4/1986 | Rawlings et al. | 264/2.1 |
| 5,080,380 A | 1/1992 | Nakagawa et al. | 279/1 M |
| 5,467,249 A | 11/1995 | Barnes et al. | 361/234 |
| 5,615,590 A | 4/1997 | Speckhahn | 82/162 |
| 5,711,196 A * | 1/1998 | Reid et al. | 82/1.11 |
| 5,738,165 A | 4/1998 | Imai | 165/80.2 |
| 5,841,624 A | 11/1998 | Xu et al. | 361/234 |
| 6,248,020 B1 * | 6/2001 | Morath et al. | 470/57 |

OTHER PUBLICATIONS

Leander J. Salzer et al., "Quick–Flip Locator for Micromachining," Los Alamos National Laboratory 1996 R & D 100 Entry.

* cited by examiner

*Primary Examiner*—Henry Tsai
(74) *Attorney, Agent, or Firm*—Gemma Morrison Bennett

(57) ABSTRACT

A locator with a part support is used to hold a part onto the kinematic mount of a tooling machine so that the part can be held in or replaced in exactly the same position relative to the cutting tool for machining different surfaces of the part or for performing different machining operations on the same or different surfaces of the part. The locator has disposed therein a plurality of steel balls placed at equidistant positions around the planar surface of the locator and the kinematic mount has a plurality of magnets which alternate with grooves which accommodate the portions of the steel balls projecting from the locator. The part support holds the part to be machined securely in place in the locator. The locator can be easily detached from the kinematic mount, turned over, and replaced onto the same kinematic mount or another kinematic mount on another tooling machine without removing the part to be machined from the locator so that there is no need to touch or reposition the part within the locator, thereby assuring exact replication of the position of the part in relation to the cutting tool on the tooling machine for each machining operation on the part.

12 Claims, 7 Drawing Sheets

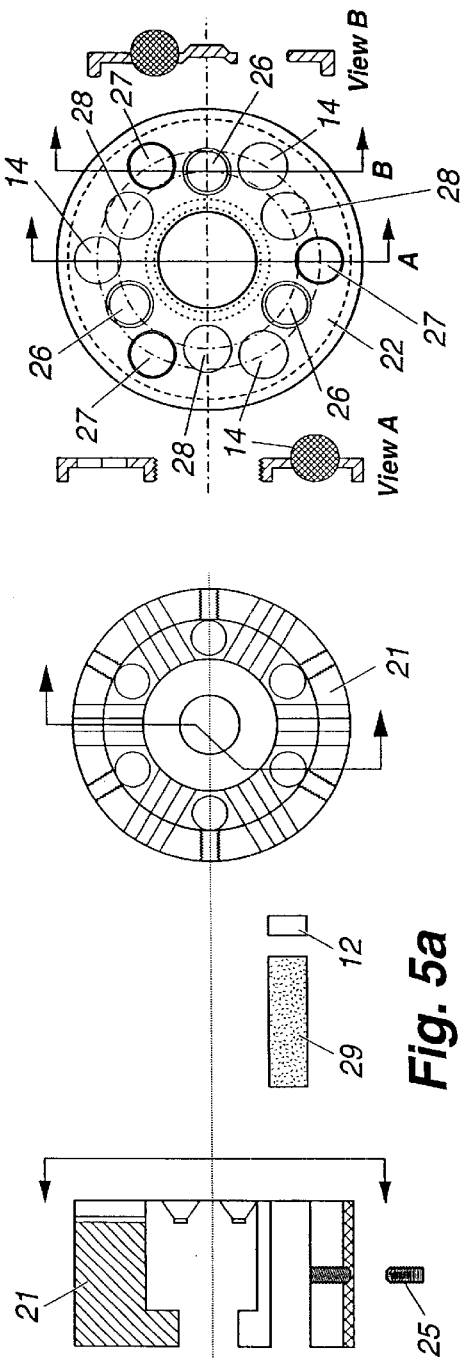
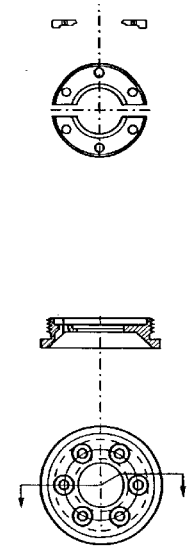
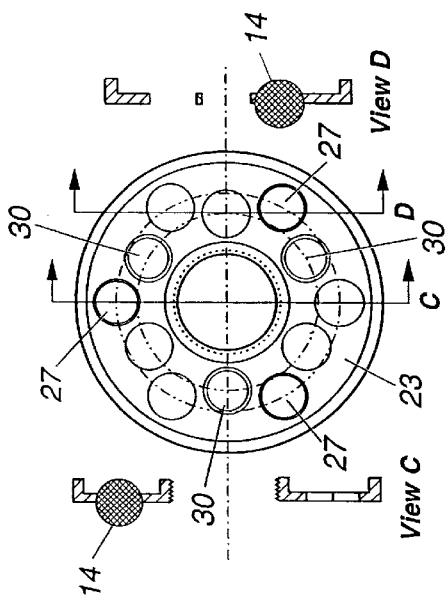
Fig. 5a
Fig. 5b
Fig. 5c
Fig. 5d
Fig. 5e

REVERSIBLE MICROMACHINING LOCATOR

This application is a C-I-P of Ser. No. 09/276,861 filed Mar. 26, 1999 abandoned, and is a continuation of U.S. patent application Ser. No. 08/925,096, filed Sep. 8, 1997, now issued as U.S. Pat. No. 5,944,329, and claims benefit of Provisional No. 60/025,849 filed Sep. 6, 1996.

This invention was made with government support under Contract No. W-7405-ENG-36 awarded by the U.S. Department of Energy. The government has certain rights in the invention.

TECHNICAL FIELD

This invention relates to precision machining or micromachining of miniature parts. More particularly, the invention relates to a method and apparatus for holding a miniature part in an exactly replicatable position on a tooling machine such as a lathe, polisher or jig bore.

BACKGROUND ART

Miniaturization of parts is a recognized need in today's increasingly complex and highly technical world. There is a need for developing efficient ways to machine very small components to precise specifications with greater accuracy within closer tolerances. Yet in conventional machine shops, the means for securing miniature parts to commercially available tooling machines are limited or nonexistent. Although small collets, chucks, mandrels and face plates work well for turning diameters or threading thin rods in conventional tooling machines, when specifications require multiple machining operations on the same millimeter-sized part, particularly a complex part, with close tolerances, even collets, chucks, mandrels and face plates are inadequate. Securing and positioning extremely small parts on a tooling machine such as a lathe, polisher or jig bore for precise machining is very difficult and sometimes impossible to do accurately. This difficulty is greatly increased when the miniature part specification requires extremely small tolerances and must be machined on more than one surface or from more than one position with relation to the tooling machine.

In conventional practice, miniature blank parts (i.e., parts without pattern or design, those which have not yet been machined) are first secured to the tooling machine with a collet (which is a split, cone-shaped sleeve) for the initial machining process, then have to be glued (e.g., epoxied) to a mandrel or substrate and accurately aligned with a microscope for any additional machining processes. This multi-step process is inefficient, time consuming and often produces inaccuracies. Even when a collet is used for each of more than one machining step, the accuracy of the alignment of the part is compromised each time the part has to be repositioned on the tooling machine. Use of a collet for a multistep machining process requires removal, reversal, coordinate repositioning and precise reattachment of the part blank to the spindle center line of the tooling machine.

When the part is glued to a mandrel or substrate for additional machining steps, realignment of the glued part is often very difficult and depends upon the condition of the equipment and the skill of the operator in repositioning the part on the tooling machine. Removing the glued part after machining or in between steps is often difficult.

In conventional practice, the amount of glue applied, the determination of the position of the part relative to the tooling machine, and the necessary repositioning of the part for additional machining may cause processing difficulties or tolerance inaccuracies resulting in scrap parts.

Although traditionally vacuum forces are used to retain larger parts within tooling machines, such forces are too weak to retain miniature parts in the tooling machine when the tooling machine applies molding or cutting force. So use of vacuums to hold miniature parts, and particularly miniature parts which have to be repositioned more than once for machining more than one surface, is not a satisfactory solution.

Typically, the greatest source of errors in machining with conventional part holders is in relocating a part for subsequent fabrication steps such as additional machining on another surface of the part. During additional fabrication steps, the accuracy of the machining is highly dependant upon the skill, experience and finesse of the operator and even with special effort an operator can usually only achieve accuracy within about 25 micrometers at best. The present invention, in contrast, improves the art by allowing a locator holding the part to be reattached to a kinematic mount on a tooling machine with a significantly greater positioning accuracy (generally about 0.25 micrometer or less). Furthermore, with the invention the alignment of the part for subsequent machining steps does not require a skilled operator and can be accomplished robotically.

Accordingly, it is an object of the present invention to provide a device which enables precision machining of very small or complex miniature parts which is adapted to work with conventional tooling machines.

It is a further object of the present invention to provide a device which can be secured to a tooling machine to hold a part in order to enable an operator to achieve precision machining with accuracy within tolerances of less than about 0.25 micrometer.

It is also an object of the present invention to provide a miniature part holding device which can be secured to a tooling machine for a single machining process and which can be removed and inserted into another tooling machine (or reinserted into the same tooling machine) to allow additional machining on other surfaces of the miniature part without relocating the part from the device between machining processes.

It is another object of the present invention to provide a device which enables milling precise patterns within close tolerances of the specifications, such as required for optics or semiconductor technology, on several surfaces of a miniature part precisely and without any need to handle any surface of the part.

It is yet another object of the present invention to eliminate cost and time of tool realignment and multiple machine setups when a miniature part requires machining on more than one surface of the part.

It is still a further object of the present invention to provide an apparatus to hold two or more separate miniature parts in precise positions during assembly steps.

A final object of the present invention is to provide an apparatus to hold a blank from which multiple parts are machined with selective and precise access to the parts by the machine tool.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF INVENTION

To achieve the foregoing and other objects, and in accordance with the purposes of the present invention, as embodied and broadly described herein, there has been invented an apparatus comprising: at least one locator disposed upon a kinematic mount which can be positioned on a conventional tooling machine and a part support disposed upon the locator. In operation, a blank part to be machined is secured between the part support and the locator. The locator has disposed therein a plurality of steel balls placed at equidistant positions around the planar surface of the locator. The kinematic mount has a plurality of magnets which alternate wth grooves about the circular planar surface of the kinematic mount. The steel balls on the locator are in register with the grooves on the kinematic mount when the locator is placed on the kinematic mount. When the locator holding the part blank is coupled to the kinematic mount, the part is exposed for the selected machining process by holes appropriately positioned in the locator. Because the locator is removably attachable to the kinematic mount by virtue of its shape and the magnetic fields of the magnets in the kinematic mount, it can easily be removed from the kinematic mount, reversed, and repositioned on the kinematic mount for additional machining of the part therein. Further, the locator can likewise be removed from the kinematic mount and placed onto another tooling machine having a properly aligned kinematic mount without losing the position of the part relative to the position of the machine tool because of the part being held securely in the locator during the transition.

A further embodiment utilizes multiple locators in accordance with the invention, with the locators being designed to be stackable, each one adjacent to another, as well as to be removably attachable to the kinematic mount either individually or as a coupled unit. This multiple locator embodiment is particularly useful for micromachining assembly processes or complex processes which involve both micromachining steps and assembly steps with multiple parts. Because of the unique design and use of magnetic forces of all embodiments of the present invention, positioning errors of less than 0.25 micrometer for each machining process can be achieved using the invention devices.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 5a, 5b, 5c, 5d, and 5e include top and cross sectional views of the components of the multiple stacked locator embodiment of the present invention. FIG. 5a is a cross-sectional view of a kinematic mount. FIG. 5b is a cross sectional view of a first locator with cuts along the A and B axes. FIG. 5c is a cross sectional view of a second locator, with cuts along the C and D axes.

FIG. 6a shows locator 22 present on the kinematic mount and FIG. 6b shows locator 23 present on the kinematic mount.

FIG. 7a is a section through the locators showing the steel balls and FIG. 7b is a section through the locators showing the offset bosses.

BEST MODES FOR CARRYING OUT THE INVENTION

It has been discovered that parts for machining can be held on the machine in a manner that permits removal and replacement of the part so as to present a different surfaces of the part for machining without losing the exact position or register of the part relative to the machine tool by supporting the part in a locator device with a part support and locking the locator onto a kinematic mount on the tooling machine with positioning grooves and magnets or other connectors.

Figure 1:
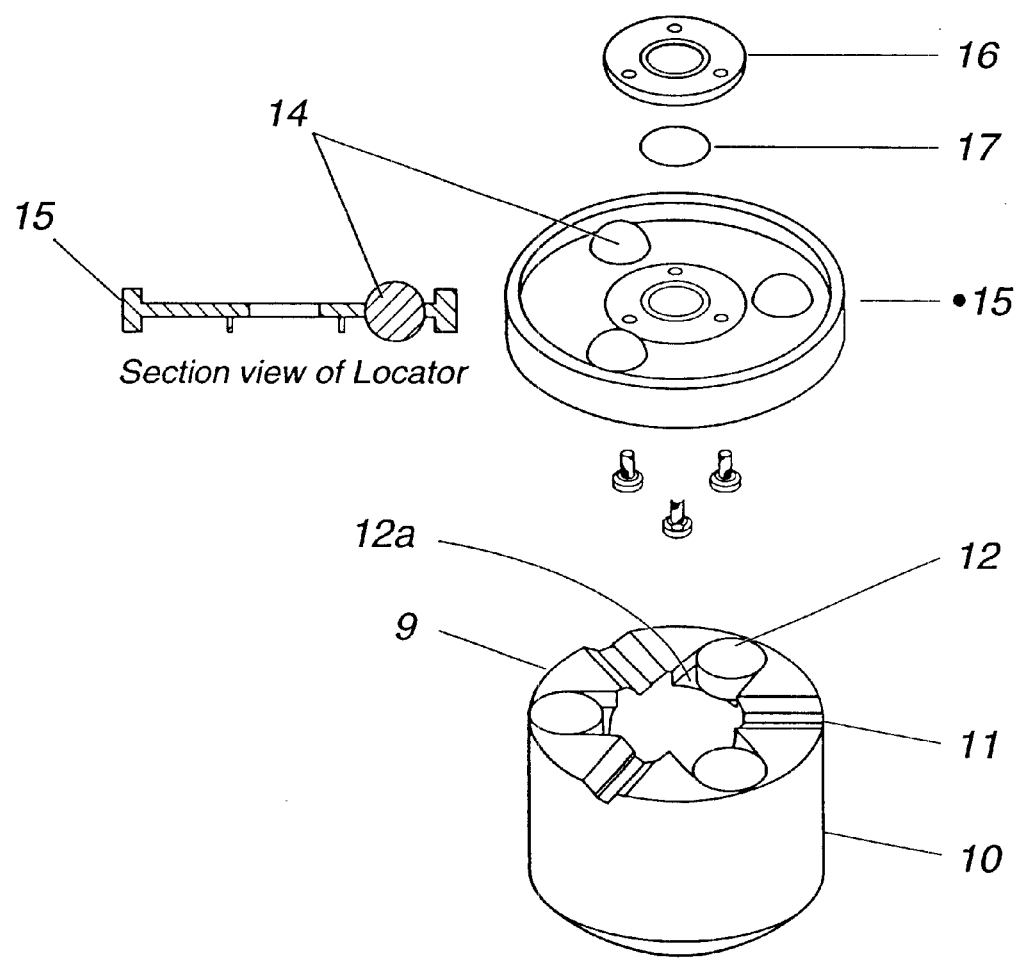
FIG. 1 is an exploded perspective view of a simple embodiment of the present invention.

A simple presently preferred embodiment of the present invention is shown in the exploded perspective of FIG. 1. The invention comprises three primary components: (a) a locator 15; (b) a kinematic mount 10; and, (c) a part support 16. The kinematic mount 10 is a steel (or other material to which magnets are attracted) cylinder having a plurality of V-grooves 11 formed into a top surface 9 of the kinematic mount 10. Each of the plurality of V-grooves 11 are equidistant from each other in the top surface 9 of the kinematic mount 10. Preferably, the V-grooves 11 are spaced 120 or 60 degrees apart from each other about the top surface of the kinematic mount 10. Groove shapes other than V-grooves can be utilized as long as the projections of the locator 15, as described below, fit within the grooves of the locator 15 such that the locator 15 is maintained in position upon the kinematic mount 10.

The kinematic mount 10 is precisely positioned relative to the center line or axis of the cutting tool on-the tooling machine during the tooling machine setup.

A rare-earth magnet 12 is embedded in a pocket 12a between each V-groove 11 in the surface of the kinematic mount 10. Alternatively, other types of magnets, such as electromagnets, can be used to create the attractive force between the locator 15 and the kinematic mount 10. Electromagnets can be particularly preferred if a larger sized locator is utilized to perform machining on a larger than micromachining scale. Specifically, stronger magnetic forces are used with larger diameter locators for holding larger parts.

Other types of connections between the locator 15 and the kinematic mount 10 can also be used. Examples include, but are not limited to, gravity or vacuum forces combined with the projection and groove configuration between the locator 15 and the kinematic mount 10.

It is necessary that both the locator 15 and the kinematic mount 10 be properly constructed to incorporate the particular type of connection employed. For example, to utilize vacuum forces, the kinematic mount 10 may be adapted to produce a vacuum and the locator 15 must have an appropriate surface to be attracted to and remain on the kinematic mount 10 when the vacuum is created.

It is presently preferred, however, that the mode of connection allow for easy attachment and removal of the locator from the kinematic mount 10. The connection arrangement preferably enables easy attachment of either surface of the locator 15 to the kinematic mount 10 so that the locator 15 can be taken off the kinematic mount 10, reversed, and replaced on the kinematic mount 10 without removal of the part from the locator 15. Therefore, use of magnetic forces is the presently preferred manner of connecting or attaching the locator 15 to the kinematic mount 10 in the invention, and the inclusion of magnets 12 in the kinematic mount 10 is a presently preferred embodiment.

The removable locator 15 is a washer-like steel disk having a plurality of equally spaced steel balls 14 partially embedded within the surface of the locator 15 so that they are firmly attached to the locator 15 and also project beyond the surface of the locator 15. The steel balls 14 can be attached to the locator 15 in any suitable manner. In a presently preferred embodiment, the steel balls 14 are crimped into position on the locator 15. Projection shapes other than the portions of spheres of the steel balls 14 can also be used to position the locator 15 upon the kinematic mount 10.

The locator 15 of the presently preferred embodiment has three equidistantly-spaced steel balls 14, that is, three steel balls are located at 120° intervals around the surface of the locator 15. Because of this design, one side of the locator 15 (depicted as A in FIG. 2) is substantially similar (with only slight modifications) to the other side of the locator 15 (depicted as B in FIG. 2). Sides A and B of locator 15 are substantially mirror images of each other. Further, because of this design, those of skill in the art will appreciate that locator 15, which is readily detachably attached from the kinematic mount 10, can be easily put on, taken off, reversed ("flipped over"), then replaced for machining of two opposite surfaces of the part being held therein. In this presently preferred embodiment, the locator 15 is magnetically attached to the kinematic mount 10 with either surface A or surface B in contact with the kinematic mount 10. When either surface A or B of the locator 15 contacts the kinematic mount 10, the steel balls 14 sit in V-grooves 11. The parts are mechanically designed to have no greater than the desired positioning error. Positioning error of less than 0.25 micrometer is achievable with the present invention.

To set up a precision, computerized numerical control (CNC) tooling machine such as, for example, a lathe, an operator must precisely position the cutting tool relative to the location of the part on the spindle. This is known in the art as "indicating the part". This setup entails accurately determining, entering into the computer, and positioning the cutting tool along the X- and Z- axes. Indicating a part and resetting tool positions for each subsequent operation are time-consuming tasks which require operator skill and accuracy.

For practice of the present invention, indicating the part can be done using any conventional method. For example, after the kinematic mounts 10 are secured to the tooling machine, each kinematic mount 10 is precisely positioned relative to the center line or axis of a conventional spindle. Then a small brass rod (not shown) having, for example, dimensions of approximately 3 millimeters in diameter and 10 millimeters in length) is centered and secured in a locator 15. The locator 15 is attached to the. kinematic mount 10. Next, the Z-axis zero position is determined by facing both ends of the rod without moving the Z-axis. This is accomplished by having one end of the rod in the locator 15 faced, reversing the locator 15 by turning it 180 degrees, and then facing the other end of the rod in the locator 15. The locator 15 is then removed from the kinematic mount 10, and the length of the rod is measured on a super micrometer or by other precise measurement means. The operator sets the Z-axis of the lathe to zero by adding half of the length of the rod to what the Z-axis position was prior to the facing of the rod and entering this value into a computer (not shown).

The X-axis zero position is then determined by machining a diameter on one end of the brass rod and measuring the diameter of the brass rod. The operator then sets the X-axis zero position by adding half of the diameter value to the X-axis position of the lathe during the diameter cut and entering this value into the computer.

Figure 2:
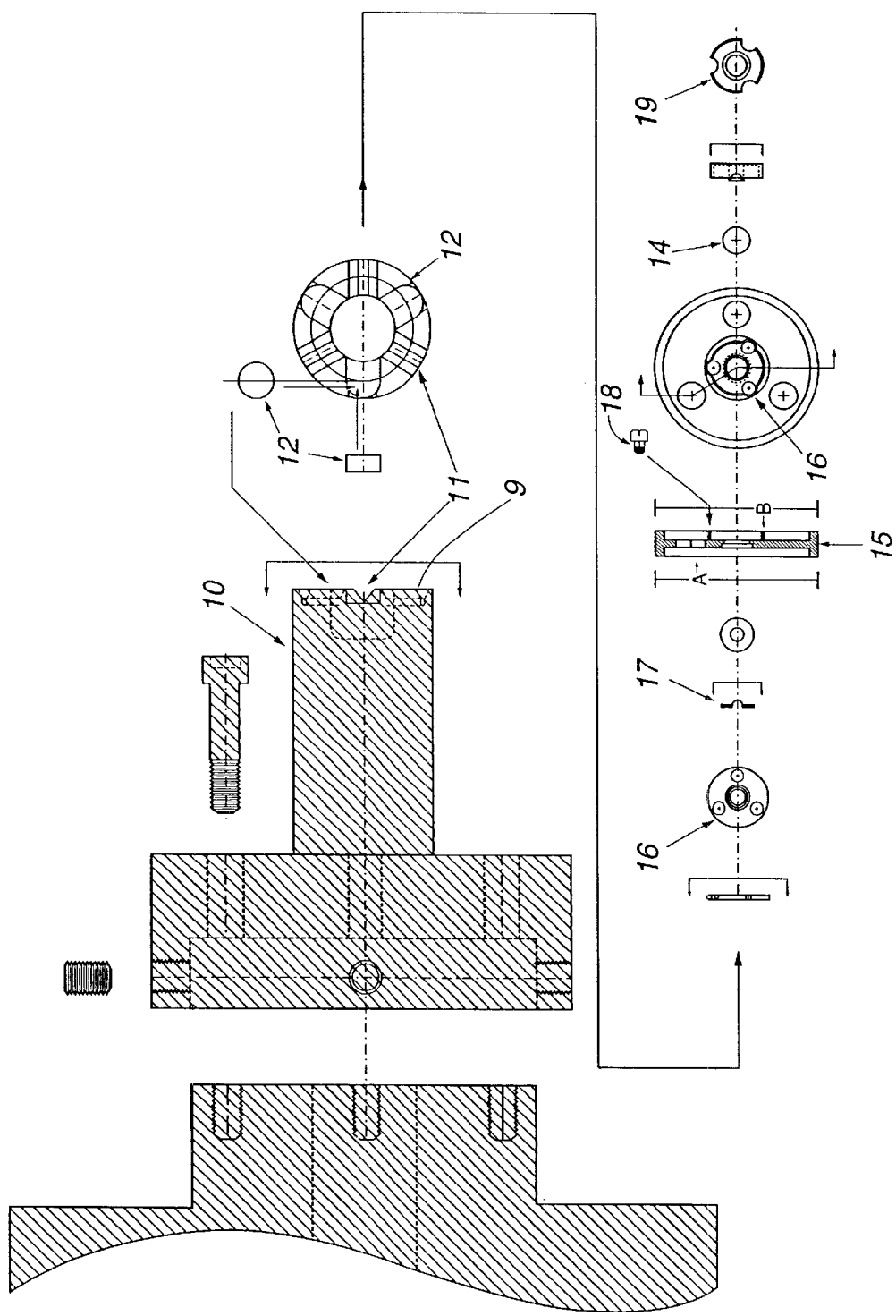
FIG. 2 is a more detailed cross sectional view of the embodiment of the present invention shown in FIG. 1.

Once the Z-axis and the X-axis are zeroed and the setup is accomplished, the operator can then machine a part. A blank part 17 (i.e., the part to be precision micromachined) is sandwiched between the locator 15 and the part support 16, which, in this embodiment, is a retainer ring. The retainer ring is then securely coupled to the locator 15 by any suitable method. Screws 18 are shown in FIG. 2 for securing the part support 16 to the locator 15. As those skilled in the art will appreciate, the part support 16 can be modified to accommodate the shape of the part 17 that must be retained within the locator 15 by the part support 16.

Because both surfaces of the locator 15 are substantially mirror images, either surface can be readily coupled with the kinematic mount 10. Magnetic forces from the magnets 12 attract the locator surface and the steel balls 14 fit within the V-grooves 11, thereby positioning the locator 15. When the locator 15 and the kinematic mount 10 are securely coupled together, the accuracy of the position of the part 17 is assured since the steel balls 14 are the only components of the locator 15 which contact the kinematic mount 10. Because of the unique method in which the locator 15 and the kinematic mount 10 couple together, it will be apparent to those with skill in the art tha the locator 15 can be readily removed from the kinematic mount 10, reversed, and reattached securely to the kinematic mount 10 without any need for touching or handling the part 17. Further, it will be appreciated that removal of the locator 15 from the kinematic mount 10 allows the locator 15 to be readily transferred to and attached to other tooling machines having similarly designed and positioned kinematic mounts if desired or necessary for subsequent machining operations. Depending upon the tooling machine product demands, several locators 15 can be used simultaneously on several different tooling machines.

Figure 3:
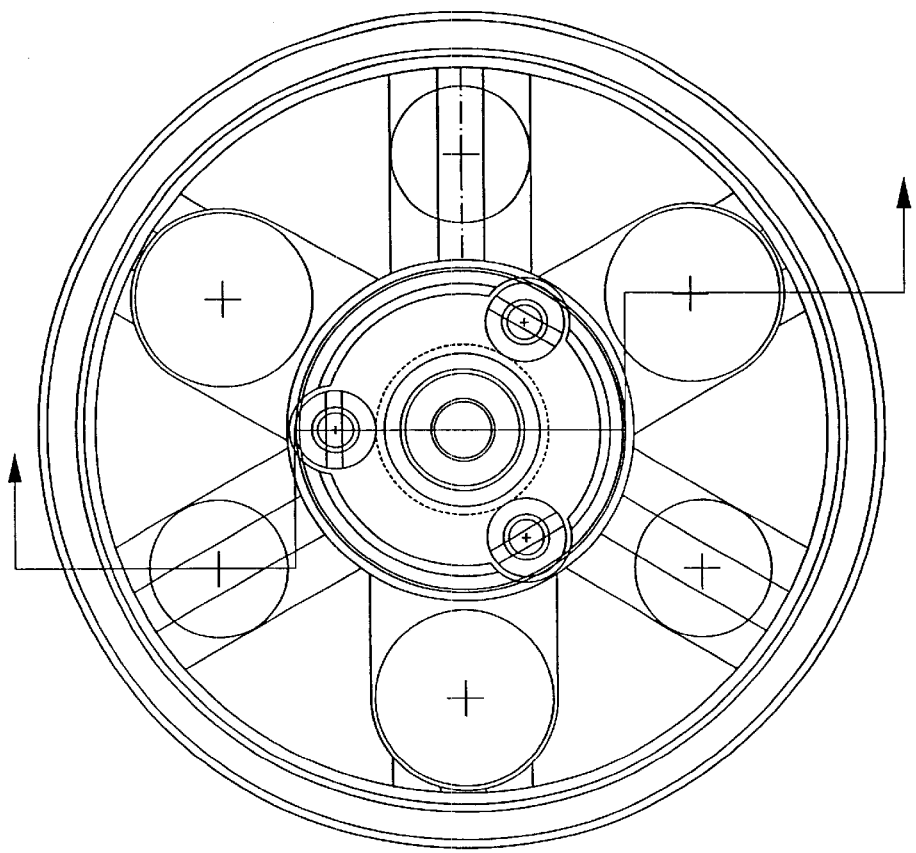
FIG. 3 is an even more detailed cross sectional view of a portion of FIG. 2.
Figure 3:
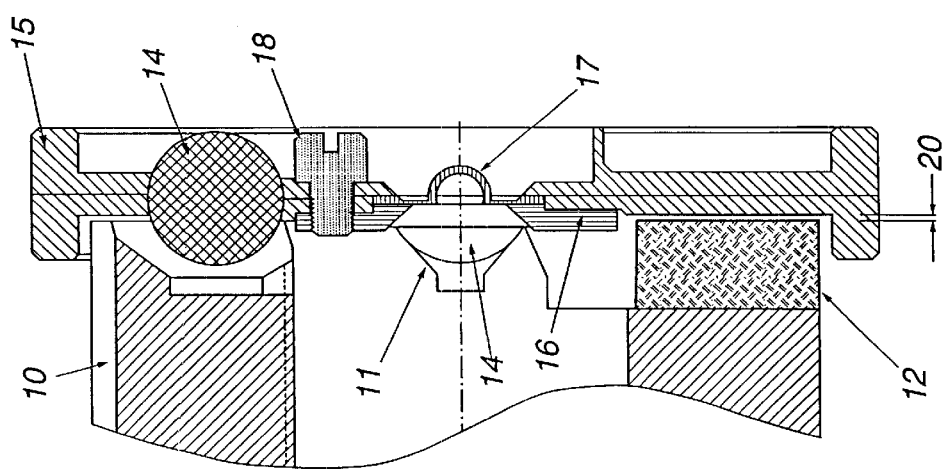

In one example of an important application of the invention apparatus and method, the present invention was used to machine beryllium hemishells which were joined to make laser targets for the Inertial Confinement Fusion program of the Department of Energy. The invention was employed on a Pneumo Ultra™ 2000 high-precision lathe. To precision machine the beryllium hemishell, a blank part was placed in the locator, the outer surface of the hemishell was first machined, and then the locator was flipped over to machine the inner surface of the hemishell. Next, the hemishell, still in the locator device, was moved to another machine for polishing of both surfaces. Then the hemishell, still in the locator device, was taken to an interferometer for measurement of wall thickness. After passing quality inspections, the part was then returned to the kinematic mount on the lathe and a part support was attached to the kinematic mount with machining wax. The newly formed shell was then separated from its flange (or brim) that was used to secure it in the locator by cutting along the equator of the shell where the part was held by the part support (shown at 19 in FIG. 2). All steps were done without having to relocate the part within the locator or realign any of the tooling machines. The part was machined to an accuracy of 0.25 micrometer (depicted as 20 in FIG. 3). Subsequent hemispheres were machined in the same way using the same tooling machine setup without further time-consuming indicating procedures.

As shown by this example, use of the present invention results in a savings of time, reduces scrap ("killed parts") by minimizing human errors that result in parts that fail to meet predetermined specifications, and further permits manufacture using only a single setup of tooling machines when a plurality of identical parts are to be fabricated. The present invention can be used in a number of different applications. For example, it can be used to great advantage for making parts which must be precisely repositioned for multiple machining and inspection steps. The present invention is well suited for diamond-facing operations on small lenses such as those required for fiber-optic probes or surgical tools. Both sides of the optic can be faced without fear of scratching or damaging the surfaces during handling between facing steps. The present invention is also suitable for making printer head parts for ink jet printers. Machining parts on one machine and microdrilling them on another can be done without alignment problems by leaving the part in a locator with part support during both operations.

In an alternative embodiment of the present invention, the invention is used to precisely join small matching parts, such as the two hemishells of a laser target or optical lenses consisting of two parts. The V-grooves in the kinematic mount are extended to become diameter cuts, dividing the surface of the kinematic mount into sixths. In this embodiment, two separate locators have three equally spaced clearance holes machined into them at 60° intervals around the surface of the locator. The clearance holes are offset 60° from the steel balls of the locator. The two locators are then stacked on a single kinematic mount with the steel balls of the upper locator offset 60° from those of the lower locator. Similar clearance holes are machined for the magnets and the offset bosses, as further described below. The same accuracy of registration is achieved as with a single locator since the V-grooves of the kinematic mount continue through the center of the kinematic mount. To join the hemishells, each hemishell is machined separately in its locator, the two locators are piggy-backed on the kinematic mount to align the equators of the hemishells, and the hemishells are joined by any suitable method, including, but not limited to, laser fusing, electron beam welding, brazing or heating.

Although usable as a set, the two stackable locators can also be used individually. This capability is useful if, for example, one or the other of the parts needs to undergo a separate different or particular machining process.

Figure 4:
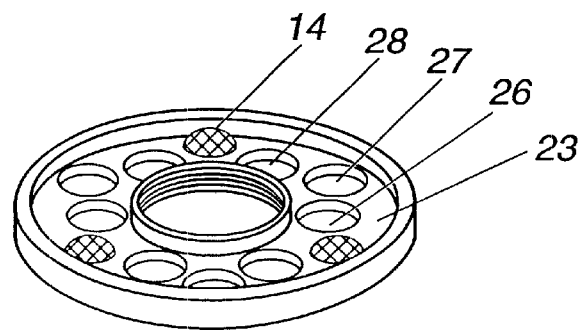
FIG. 4 is an exploded perspective view of the multiple or stacked locator embodiment of the present invention.
Figure 4:
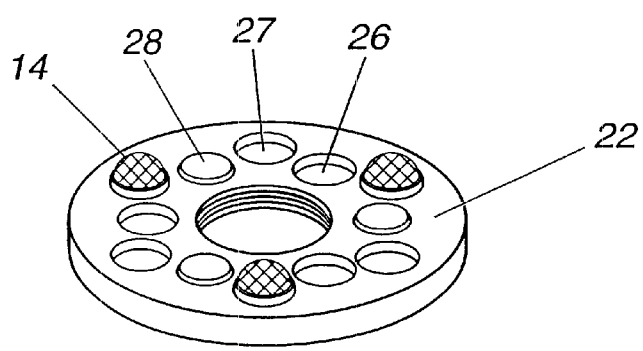
Figure 4:
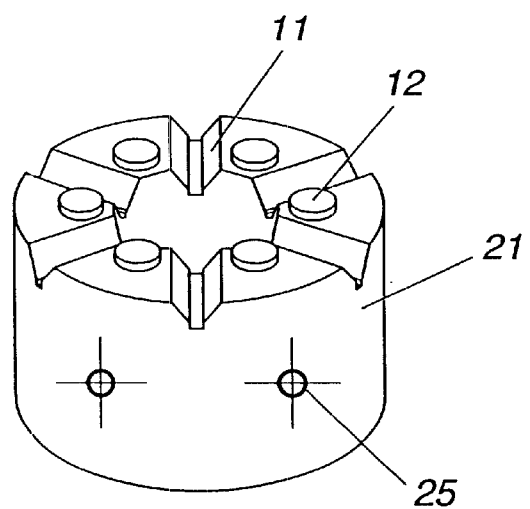

FIGS. 4, 5, 6 and 7 illustrate such an application of an alternative embodiment of the present invention. FIG. 4 shows the kinematic mount 10 with six V-grooves 21, a first stackable locator 22 which has a lip which overhangs the kinematic mount 10 in a downward direction when set upon the kinematic mount 10, and a second stackable locator 23, which has a lip which points upward when set upon the kinematic mount 10 and first locator 22. Locators 22 and 23 are similar in that they comprise the same components; however, the arrangement of the components is slightly different to allow the locators to be stackable. Direct surface communication between the magnets of the kinematic mount and the locators is achieved through the use of offset bosses 28 and clearance holes 26, 30. It should be noted that, as illustrated in FIG. 4, the offset bosses of the first locator 22 and the offset bosses of the second locator 23 are offset in opposite directions. Thus, when the two locators are stacked upon the kinematic mount, the bosses of the first locator 22 are upwardly offset, while the bosses of the second locator 23 are downwardly offset. Both of these offsets are in a direction opposite of the lip overhang of the respective locator. This arrangement as illustrated in FIG. 7b, has the advantage of ensuring that the magnetic force between the bosses and the magnets will be equivalent for both locators. When only the first locator 22 is placed on the kinematic mount 10, every other magnet 12 attracts the indented underside of an offset boss 28 of the first locator 22, while the other alternate magnets 12 are open to the air because of the magnet clearance holes 26. When the second locator 23 is placed upon the first locator 22, the magnets 12 visible through the clearance holes 26 have direct contact with the raised surface of an offset boss of the second locator 23. Thus, when the locators are stacked, each of the six magnets present in the kinematic mount 10 has direct surface communication with either an indented underside of an offset boss of the first locator 22 or a raised surface of an offset boss of the second locator 23 by way of the magnet clearance hole present in the first locator 22.

Figure 7A:
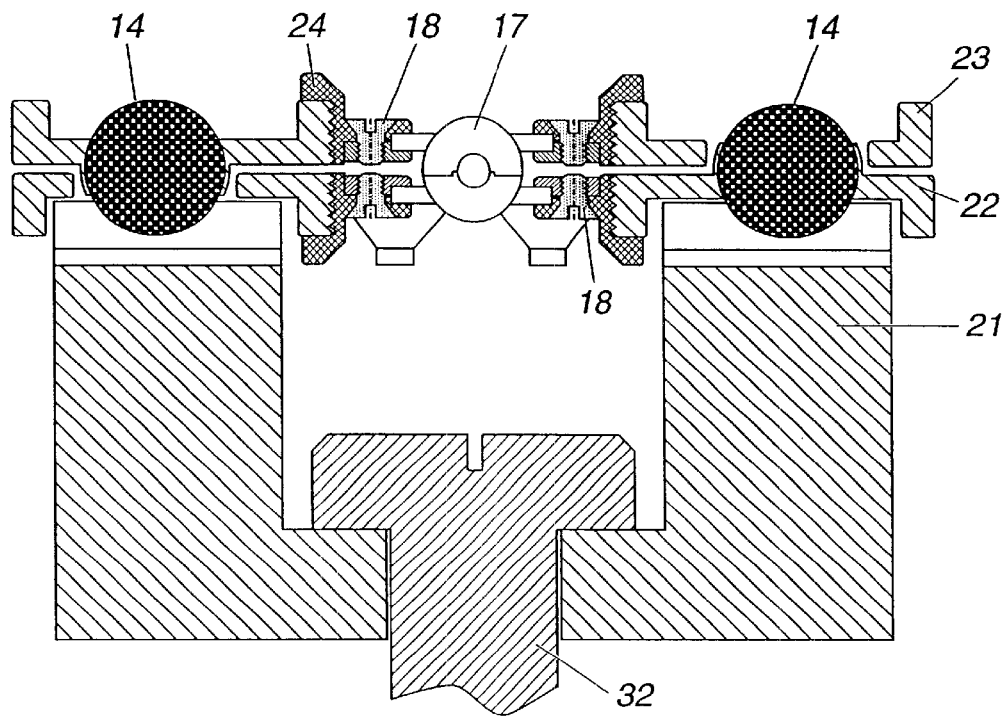
FIGS. 7a and 7b show a cross sectional view of the embodiment of the present invention which utilizes locators which can be stacked on each other, with both locators placed on the kinematic mount.
Figure 7B:
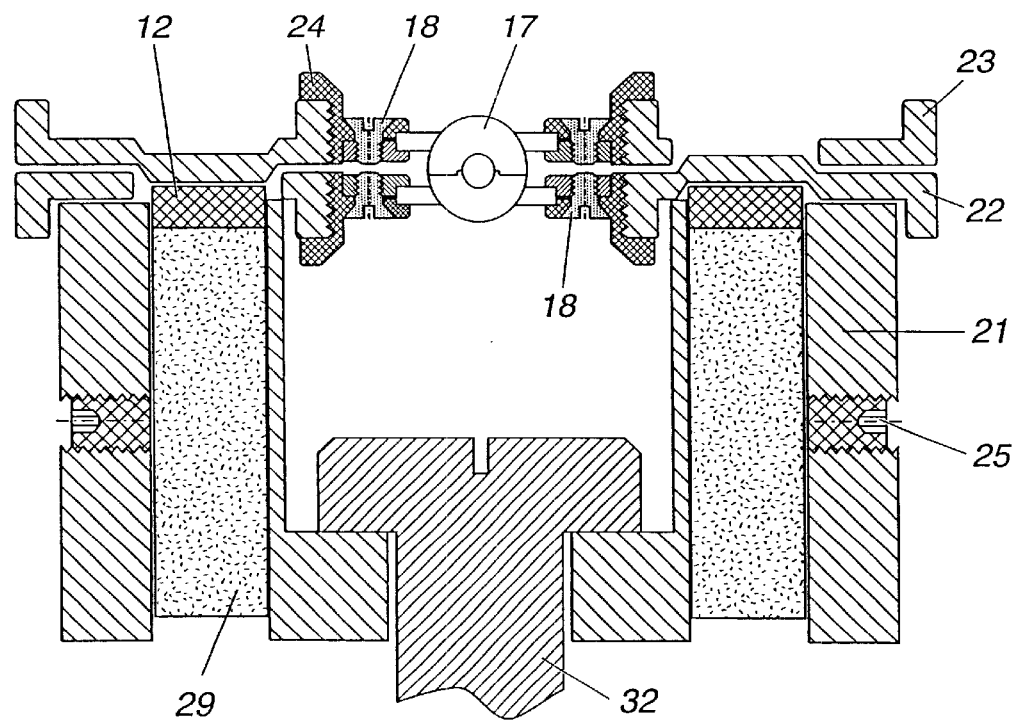

Similarly, communication between the steel balls 14 and the V-grooves 11 is achieved using clearance holes 27. The steel balls 14 of the first locator 22 and the steel balls 14 of the second locator 23 are embedded to different degrees in this embodiment of the invention. Thus, when the locators are stacked upon the kinematic mount 10, the steel balls 14 of the first locator 22 have approximately two-thirds of each steel ball protruding above the surface and one-third embedded below the surface of the first locator 22, while the steel balls 14 of the second locator 23 have approximately one-third of each steel ball protruding above the surface and two-thirds of each steel ball embedded below the surface of the second locator 23. This arrangement allows the steel balls to be on approximately the same plane when the two locators are stacked, as illustrated in FIG. 7a. When only the first locator 22 is placed on the kinematic mount 10, every other V-groove 11 has fit within it the one-third protrusion of steel ball 14 of the first locator 22, while the other alternate V-grooves 11 are open to the air because of the V-groove clearance holes 27. When the second locator 23 is placed upon the first locator 22, the V-grooves 11 visible through the clearance holes 27 are fit with the protruding two-thirds of the steel balls 14 of the second locator 23. The protruding two-thirds of the steel balls of the first locator 22 pass through the steel ball clearance holes 27 of the second locator 23. Thus, when the two locators are stacked, each of the six V-grooves present in the kinematic mount 10 are fit with either a steel ball 14 of the first locator 22 or a steel ball of the second locator 23 by way of the steel ball clearance hole 27 present in the first locator 22.

The kinematic mounts 10 of FIGS. 4, 5, 6, and 7 also illustrate two additional features of the stackable embodiment of the present invention. First, the kinematic mount 10 can have an adjustable magnet mounting system comprising set screws 25 and an adjuster for magnet position 29. This arrangement allows the magnets to be easily replaced into a selected position after the kinematic mount 10 has been altered, for example, through the machining of a new surface.

Figure 6A:
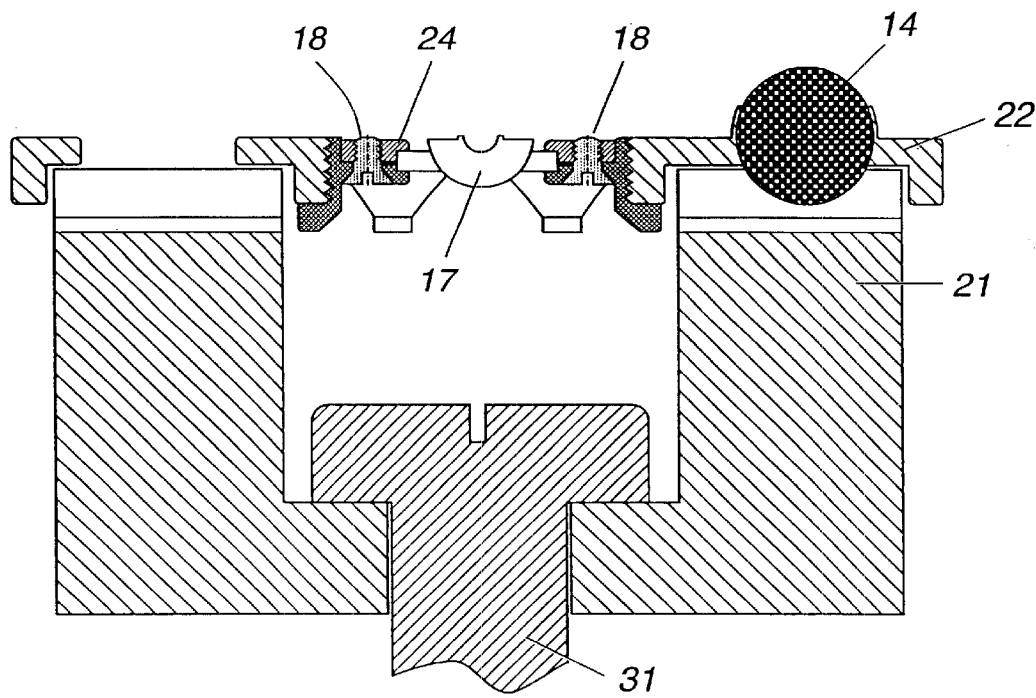
FIGS. 6a and 6b show cross sectional views of the embodiment of the present invention which utilizes locators which can be stacked on each other, but with only one locator placed on the kinematic mount in each view.
Figure 6B:
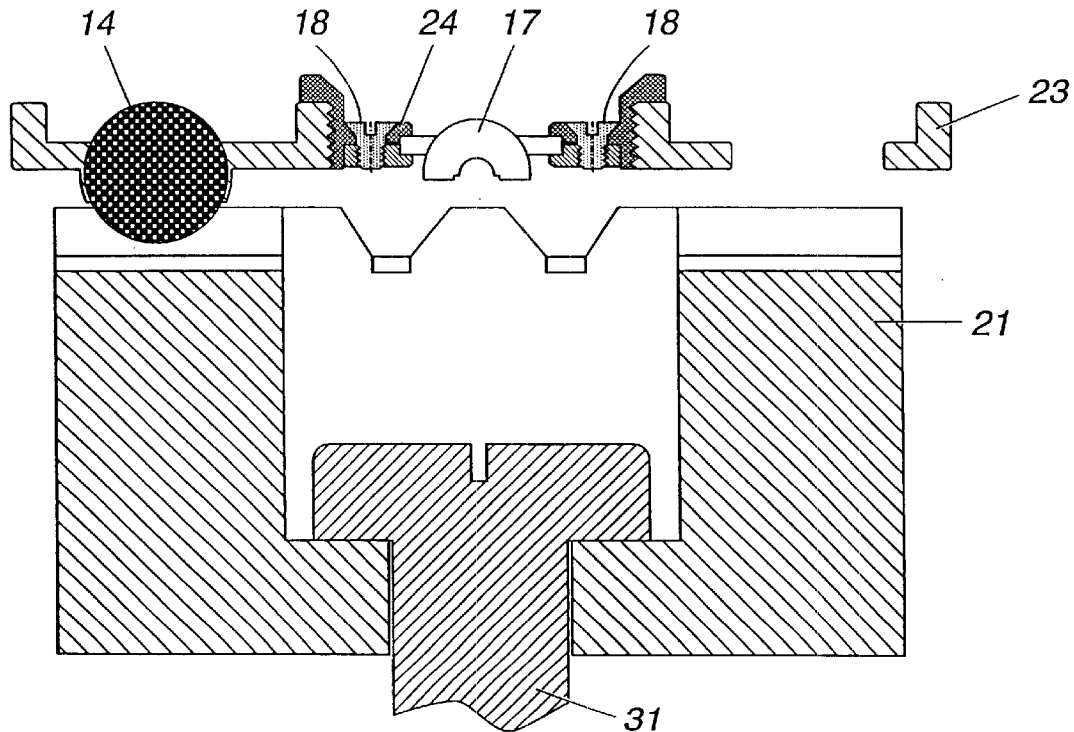

A second feature illustrated in FIGS. 4, 5, 6, and 7 is a particular part support 24 which can be used to clamp the part into place during machining or assembly in the stackable embodiment of the invention. The particular part support 24 is made in the following manner. A blank for the support part is placed within the locator and a hole is machined in the center of the blank. A slot is then machined into the inner circumference of the hole. A hole for a connector is then drilled on either side of the part support. A disk-shaped lower portion of the support part blank is separated from the upper portion, splitting the machined slot in half. This operation results in a part support which can clamp onto either side of the part, with an extended piece of the part to be machined in the hole formed by the slot. The part is clamped securely into position using the connector 18. FIG. 6 illustrates an individual part being held in place by the clamp part support and ready for a machining or assembly process to be performed on it. FIG. 7 illustrates two parts being held in place by clamp part supports and ready for a machining or assembly process to be performed on them. Thus, in this embodiment, the locator is used to produce the part support, as well as to perform the machining operations upon the part once the part is clamped into place using the part support.

In another embodiment, the present invention can also be modified to machine of multiple parts out of a single part blank. This capability is especially useful in mass-producing microlenses or other microassemblies for nanotechnologies. For this application, the kinematic mount is positioned on a lathe such that the center of the kinematic mount is offset from the center of the axis of the lathe, although it is properly counterbalanced. A locator with a relatively large part blank is then fastened to the kinematic mount and a single part is machined at the center of the lathe, but off-center on the part blank. Rotating the locator so that the steel balls seat one V-groove over from the previous position of the locator on the kinematic mount exposes a new portion of the part blank to the machining tool for machining a second part. A third rotation would allow a third part to be machined. Additional rotations and machining can be accomplished as desired. Parts so machined can then be inspected, polished or further processed on the same machine or other machines that have similarly off-center kinematic mounts. In this embodiment of the invention, the machined parts are on the lathe center, while the locator and the kinematic mount are eccentrically mounted.

In yet another embodiment, the present invention is modified for machining of larger parts that require precise repositioning during multistep fabrication. It is modified by increasing the size of the components and the power of the magnets or strength of other connectors, or modified in other ways apparent to those with skill in the art once practicing this invention. This embodiment of the invention is useful for manufacturers of such articles as silicon wafers which require etching of each wafer surface and laser optics.

The present invention apparatus and method may offer the only means for micromachining some particular types of parts. For example, millimeter-sized hemishells required for laser fusion targets cannot be held in a collet; gluing them to mandrels introduces seating uncertainties which can result in variations in wall thickness. Similarly, diamond-turning and polishing of optical lenses on each surface is extremely difficult with conventional holders because, in repositioning a lens to work on a second surface, the operator can easily inadvertently touch the polished surface, thereby contaminating and destroying such a polished surface or inadvertently not reposition the part exactly in register. The present invention overcomes these fabricating difficulties.

While the apparatuses, articles of manufacture and methods of this invention have been described in detail for the purpose of illustration, the inventive apparatuses, articles of manufacture and methods are not to be construed as limited thereby. The claims of this patent are intended to cover all changes and modifications within the spirit and scope thereof.

INDUSTRIAL APPLICABILITY

The invention methods and apparatuses are useful whenever there is a need to accurately position parts, particularly very small parts, for machining operations. The invention is especially useful for multiple-step machining operations.

What is claimed is:

1. A method for producing a machined part from a blank, comprising the steps of:
   (a) securing a blank to a locator, the blank comprising a first side and a second side, the locator comprising a first side and a second side that opposes the first side, the first side and second side of the locator being configured to mate with a mating surface of a kinematic mount of a tooling machine;
   (b) attaching the first side of the locator to the mating surface of the kinematic mount of a tooling machine so that a machining operation may be performed upon the second side of the blank;
   (c) performing a machining operation upon the second side of the blank;
   (d) detaching the locator from the kinematic mount;
   (e) attaching the second side of the locator to the mating surface of the kinematic mount of the tooling machine, or to the mating surface of a kinematic mount of another tooling machine, so that a machining operation may be performed upon the first side of the blank; and
   (f) performing a machining operation upon the first side of the blank, thereby producing a machined part.

2. The method recited in claim 1, wherein the machined part is a beryllium hemishell.

3. The method recited in claim 1, wherein the locator comprises a material to which magnets are attracted and the kinematic mount comprises a magnet.

4. The method recited in claim 1 wherein said locator has steel balls partially embedded in the surface of said locator and wherein said kinematic mount has grooves in the surface of said kinematic mount; and further, wherein said steel balls are sized and positioned to fit into said grooves.

5. The method recited in claim 4, wherein the step of securing the blank to the locator comprises securing the blank with a retaining ring blank support.

6. The method recited in claim 1 wherein said machined part is an optical lens.

7. A method for producing a two machined part from two blanks, comprising the steps of:
   (a) securing a first blank to a first locator, the first locator comprising a first side and a second side that opposes the first side, the first side and second side of the locator being configured to mate with a mating surface of a kinematic mount of a tooling machine;
   (b) attaching the first side of the first locator to the mating surface of the kinematic mount of a tooling machine;
   (c) securing a second blank to a second locator, the second locator comprising a first side and a second side that opposes the first side, the first side and second side of the second locator being configured to mate with a mating surface of a kinematic mount of a tooling machine;
   (d) attaching the first side of the first locator to the mating surface of the kinematic mount of a tooling machine;
   (e) attaching the second side of the second locator to the second side of the first locator;

(f) performing a machining operation upon the second blank;

(g) detaching the first locator from the kinematic mount;

(h) attaching the first side of the second locator to the mating surface of the kinematic mount of the tooling machine, or to the mating surface of a kinematic mount of another tooling machine; and (i) performing a machining operation upon the first blank, thereby producing a first machined part from the first blank and a second machined part from the second blank.

8. The method recited in claim 7 further comprising: after removing said second locator with said second machined part therein from said first locator and said first locator with said first machined part therein from said kinematic mount, reversing and reattaching said first locator with said first machined part therein to said kinematic mount without removing said first machined part from said first locator and reversing and reattaching said second locator with said second machined part therein to said first locator without removing said second machined part from said second locator; and performing a second machining operation upon each of said first and said second machined parts.

9. The method recited in claim 7 wherein said first blank is beryllium and said machining operation produces a first machined part and a second machined part which has therein the inner surface of a hemishell.

10. The method recited in claim 8 wherein said second blank is beryllium and said second machining operation produces a second machined part which has therein the outer surface of a hemishell.

11. The method recited in claim 7 wherein said first blank is beryllium and said machining operation produces a first machined part and a second machined part which has therein the outer surface of a hemishell.

12. The method recited in claim 8 wherein said second blank is beryllium and said second machining operation produces a second machined part which has therein the inner surface of a hemishell.

* * * * *